(12) United States Patent
Kwon et al.

(10) Patent No.: US 8,002,452 B2
(45) Date of Patent: Aug. 23, 2011

(54) LIGHT GUIDE PLATE, DISPLAY DEVICE HAVING THE SAME, AND METHOD THEREOF

(75) Inventors: Jae-Joong Kwon, Suwon-si (KR); Hyoung-Joo Kim, Seoul (KR); In-Sun Hwang, Suwon-si (KR); Seung-In Baek, Seoul (KR); Sung-Kyu Shim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 442 days.

(21) Appl. No.: 12/147,606

(22) Filed: Jun. 27, 2008

(65) Prior Publication Data
US 2009/0175051 A1    Jul. 9, 2009

(30) Foreign Application Priority Data

Jan. 3, 2008   (KR) .................. 10-2008-0000860

(51) Int. Cl.
*F21V 7/04* (2006.01)
(52) U.S. Cl. ................... 362/608; 362/613; 362/621
(58) Field of Classification Search .............. 362/608, 362/613, 621; 385/146, 901
See application file for complete search history.

(56) References Cited

U.S. PATENT DOCUMENTS

| 6,601,962 | B1 * | 8/2003 | Ehara et al. | 362/612 |
| 7,171,104 | B2 * | 1/2007 | Tamura et al. | 385/146 |
| 7,269,329 | B2 * | 9/2007 | Tamura et al. | 385/146 |

FOREIGN PATENT DOCUMENTS

| JP | 2003-217326 | 7/2003 |
| JP | 2005-285702 | 10/2005 |

* cited by examiner

*Primary Examiner* — Thomas M Sember
(74) *Attorney, Agent, or Firm* — Cantor Colburn LLP

(57) ABSTRACT

A light guide plate and a display device having the same are provided, which can uniformly emit light on the whole. The light guide plate includes a light input part including first and second areas to which light is incident, and a light output part neighboring the light input part and outputting light. The light having passed through the first area is emitted with its light quantity distribution biased in a first direction, and the light having passed through the second area is emitted with its light quantity distribution biased in a second direction different than the first direction.

21 Claims, 18 Drawing Sheets

LIGHT GUIDE PLATE, DISPLAY DEVICE HAVING THE SAME, AND METHOD THEREOF

This application claims priority to Korean Patent Application No. 10-2008-0000860, filed on Jan. 3, 2008, and all the benefits accruing therefrom under 35 U.S.C. §119, the contents of which in its entirety are herein incorporated by reference.

BACKGROUND OF THE INVENTION

1. Field of the Invention

The present invention relates to a light guide plate, a display device having the same, and a method thereof, and more particularly to a light guide plate and a display device having the same, which can uniformly emit light on the whole, and a method of uniformly emitting light from a light guide plate.

2. Description of the Prior Art

A liquid crystal display ("LCD") is a kind of flat panel display ("FPD") that has been most widely used, and is composed of two substrates, on which electrodes are formed, and a liquid crystal layer interposed between the two substrates. Liquid crystal molecules of the liquid crystal layer are rearranged by a voltage being applied to the electrodes, and thus the quantity of transmitted light is adjusted, so that an image is displayed.

Since the LCD itself is non-radiative, it should be provided with a backlight assembly including a light source that is a luminous element in order to display an image. The backlight assembly irradiates light from the rear of a liquid crystal panel, and operates as a surface light source emitting light to the whole liquid crystal panel. The backlight assembly as described above is classified into a direct downward type backlight assembly and an edge type backlight assembly in accordance with the position of a light source emitting light. In the direct downward type backlight assembly, a light source is located just below a liquid crystal panel, while in the edge type backlight assembly, a light source is located on the side of a liquid crystal panel and light from the light source is transferred to the whole liquid crystal panel using a light guide plate.

BRIEF SUMMARY OF THE INVENTION

It has been determined herein, according to the present invention, that as light emitting diodes ("LEDs"), which are point light sources, are used as the edge type light source, it is required to install a structure for preventing bright spots, whereby a bright part and a dark part are discriminated from each other, in a neighboring part of the LEDs and the light guide plate.

Accordingly, the present invention provides a light guide plate which can uniformly emit light on the whole.

The present invention also provides a liquid crystal display ("LCD") having a light guide plate which can uniformly emit light on the whole.

The present invention also provides a method of uniformly emitting light from a light guide plate.

According to exemplary embodiments of the present invention, there is provided a light guide plate, which includes a light input part including first and second areas to which light is incident, and a light output part neighboring the light input part and outputting light, wherein the light having passed through the first area is emitted with its light quantity distribution biased in a first direction, and the light having passed through the second area is emitted with its light quantity distribution biased in a second direction different than the first direction.

According to other exemplary embodiments of the present invention, there is provided a display device, which includes a display panel on which an image is displayed, a light source supplying light to the display panel, a light input part including first and second areas to which light is incident, and a light output part neighboring the light input part and outputting light, wherein the light having passed through the first area is emitted with its light quantity distribution biased in a first direction, and the light having passed through the second area is emitted with its light quantity distribution biased in a second direction different than the first direction.

According to still other exemplary embodiments of the present invention, there is provided a method of improving uniformity of light emission from a light guide plate, the light guide plate including a light input part to which light is incident and a light output part neighboring the light input part and outputting light, the method including forming a first area in the light input part to pass light therethrough with a light quantity distribution biased in a first direction, and forming a second area in the light input part to pass light therethrough with a light quantity distribution biased in a second direction, different than the first direction.

BRIEF DESCRIPTION OF THE DRAWINGS

The above and other features and advantages of the present invention will be more apparent from the following detailed description taken in conjunction with the accompanying drawings, in which.

DETAILED DESCRIPTION OF THE INVENTION

Figure 1:
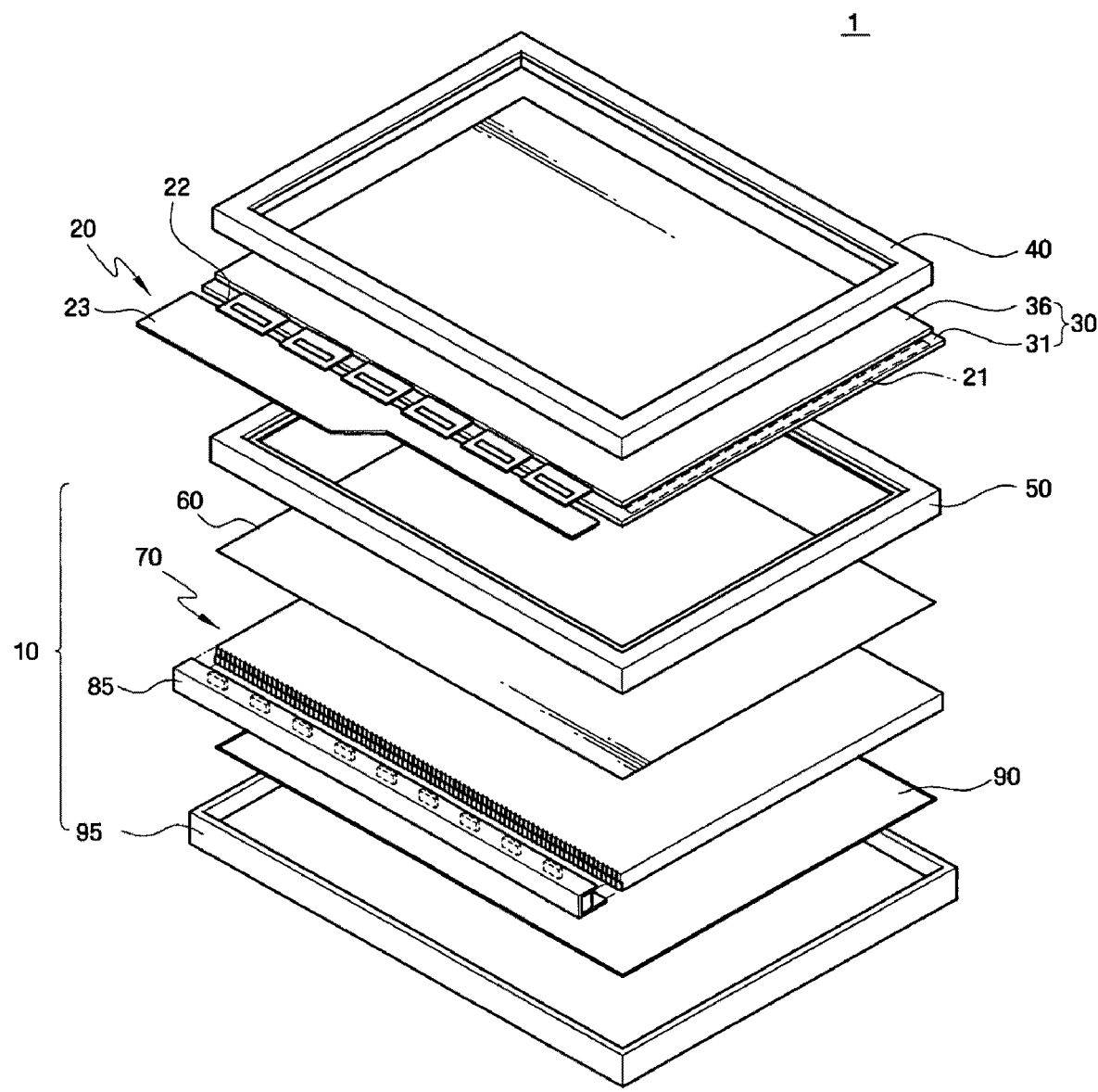
FIG. 1 is an exploded perspective view of an exemplary liquid crystal display ("LCD") according to a first exemplary embodiment of the present invention.

Hereinafter, preferred embodiments of the present invention will be described in detail with reference to the accompanying drawings. The aspects and features of the present invention and methods for achieving the aspects and features will be apparent by referring to the embodiments to be described in detail with reference to the accompanying drawings. However, the present invention is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims. In the entire description of the present invention, the same drawing reference numerals are used for the same elements across various figures.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Spatially relative terms, such as "below," "beneath," "lower," "above," "upper," and the like, may be used herein for ease of description to describe one device or element's relationship to another device(s) or element(s) as illustrated in the drawings. It will be understood that the spatially relative terms are intended to encompass different orientations of the device in use or operation in addition to the orientation depicted in the drawings.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a liquid crystal display ("LCD") according to a first exemplary embodiment of the present invention will be described in detail with reference to FIG. 1. The LCD according to the first exemplary embodiment of the present invention includes a lower substrate on which a thin film transistor ("TFT") array is formed, an upper substrate opposite to the lower substrate, and a liquid crystal layer interposed between the lower and upper substrates. Here, FIG. 1 is an exploded perspective view of an exemplary LCD according to the first exemplary embodiment of the present invention.

The LCD 1 according to an exemplary embodiment of the present invention includes a liquid crystal panel assembly 20, a backlight assembly 10, an intermediate frame 50, an upper receptacle 40, and a lower receptacle 95.

The liquid crystal panel assembly 20 includes a liquid crystal panel 30 composed of a lower substrate 31 and an upper substrate 36, a liquid crystal layer (not illustrated), a gate drive integrated circuit ("IC") 21, a data chip film package 22, and a printed circuit board ("PCB") 23.

The liquid crystal panel 30 includes the lower substrate 31 composed of gate lines (not illustrated), data lines (not illustrated), a TFT array, and pixel electrodes, and the upper substrate 36 installed opposite to the lower substrate 31 and composed of color filters, black matrices, and a common electrode. Here, the color filters and the common electrode may be formed on the lower substrate 31.

The gate drive IC 21 is integrated and formed on the lower substrate 31, and is connected to the respective gate lines (not illustrated) formed on the lower substrate 31. The data chip film package 22 is connected to the respective data lines (not illustrated) formed on the lower substrate 31. Here, the data chip film package 22 includes a wiring pattern in which a semiconductor chip is formed on a base film and a tape automated bonding ("TAB") tape bonded by a TAB technology. For example, a tape carrier package ("TCP") or a chip on film ("COF") may be used as the chip film package. However, the chip film package as described above is merely exemplary, and other alternatives are within the scope of these embodiments.

On the PCB 23, various drive components for processing a gate drive signal and a data drive signal for driving the gate drive IC 21 and the data chip film package 22 are packaged.

The backlight assembly 10 includes an optical sheet 60, a light guide plate 70, a light source 85, and a reflection plate 90.

The light guide plate 70 serves to guide the light being supplied from the light source 85 to the liquid crystal panel assembly 20. The light guide plate 70 is a panel made of a transparent plastic-based material such as acryl, and propagates the light generated from the light source 85 to the side of the liquid crystal panel 30 placed on an upper part of the light guide plate 70.

Figure 2A:
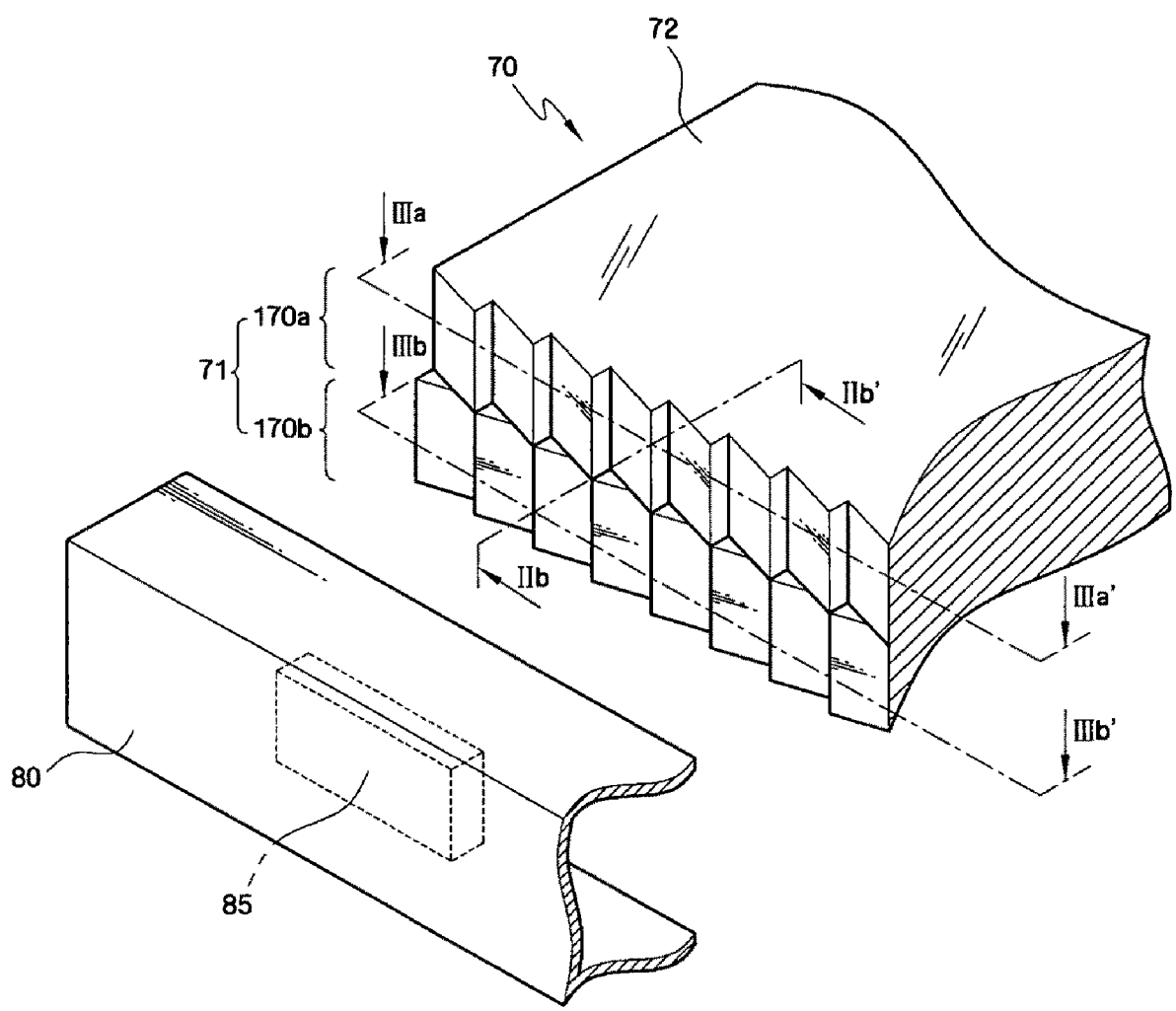
FIG. 2A is a perspective view illustrating a part of an exemplary light guide plate included in the exemplary LCD of FIG. 1.
Figure 2B:
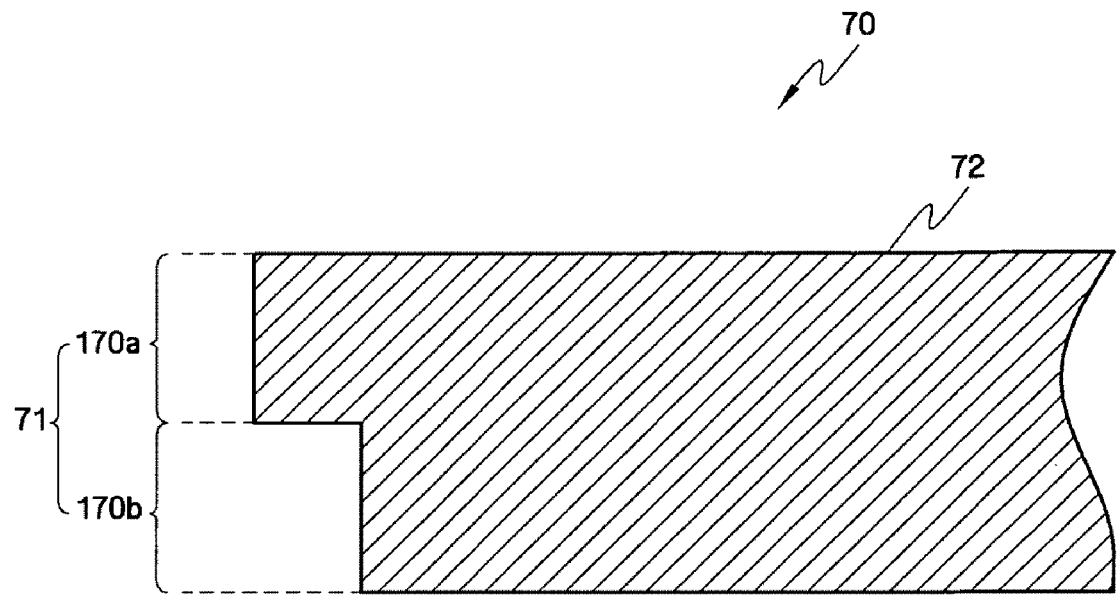
FIG. 2B is a sectional view of the exemplary light guide plate, taken along line IIb-IIb' of FIG. 2A.
Figure 3A:
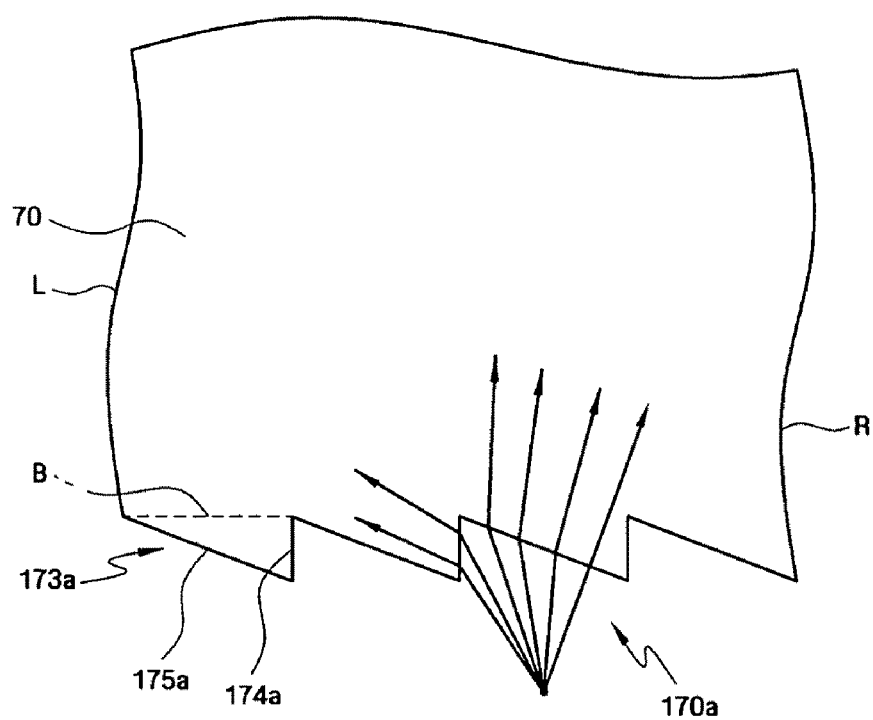
FIG. 3A is a sectional view of the exemplary light guide plate, taken along line IIIa-IIIa' of FIG. 2A.
Figure 3B:
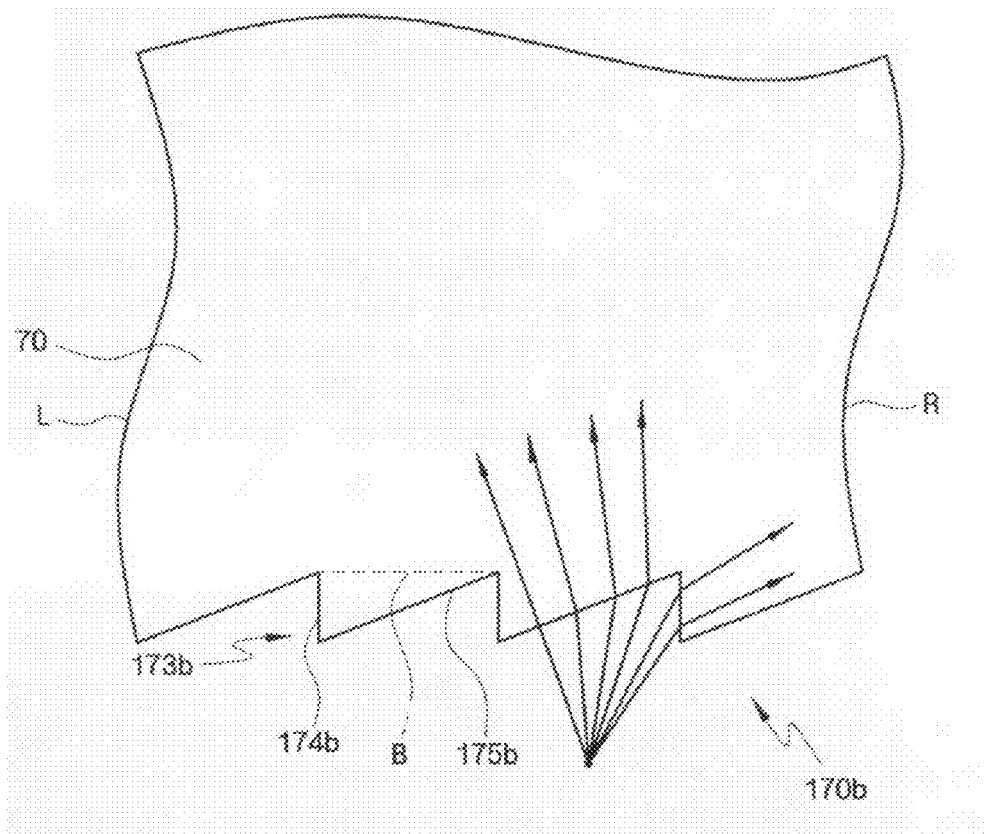
FIG. 3B is a sectional view of the exemplary light guide plate, taken along line IIIb-IIIb' of FIG. 2A.
Figure 3C:
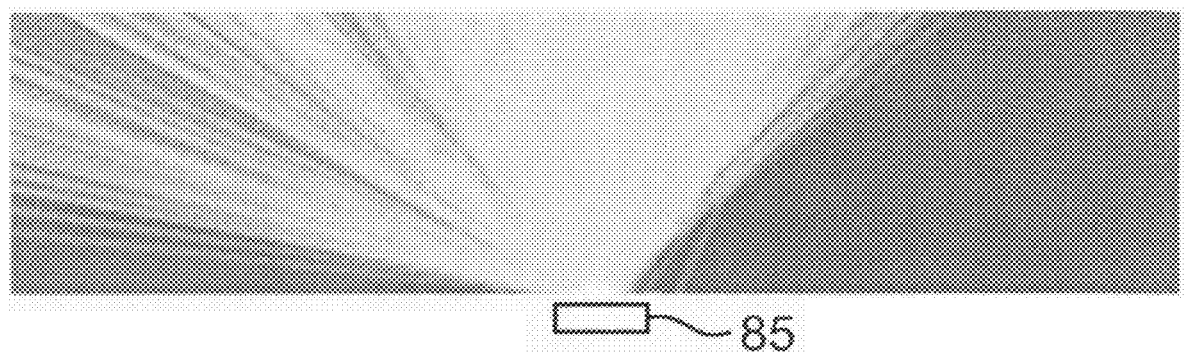
FIG. 3C is a view illustrating the luminance characteristic of light incident to a first area of the exemplary light guide plate of FIG. 3A.
Figure 3D:
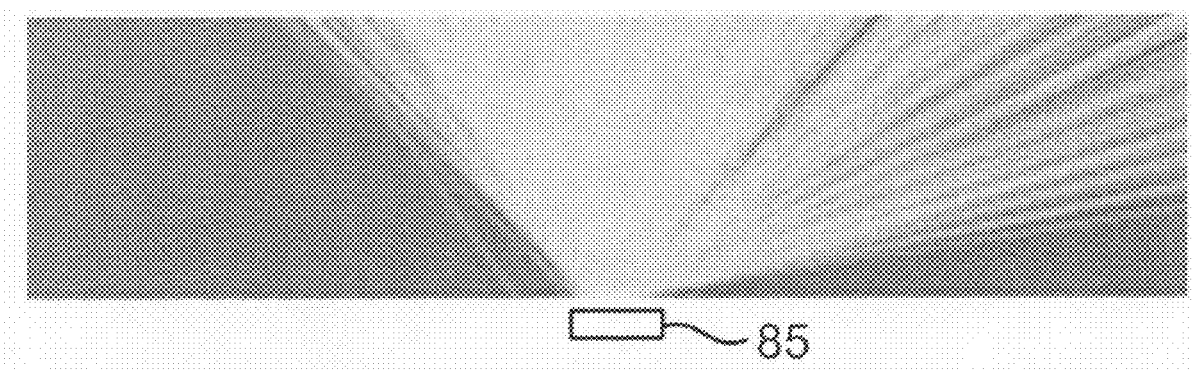
FIG. 3D is a view illustrating the luminance characteristic of light incident to a second area of the exemplary light guide plate of FIG. 3A.

Hereinafter, with reference to FIGS. 2A to 3D, the light guide plate 70 according to the first exemplary embodiment of the present invention will be described in detail. Here, FIG. 2A is a perspective view illustrating a part of an exemplary light guide plate included in the exemplary LCD of FIG. 1, and FIG. 2B is a sectional view of the exemplary light guide plate, taken along line IIb-IIb' of FIG. 2A. FIG. 3A is a sectional view of the exemplary light guide plate, taken along line IIIa-IIIa' of FIG. 2A, FIG. 3B is a sectional view of the exemplary light guide plate, taken along line IIIb-IIIb' of FIG. 2A, FIG. 3C is a view illustrating the luminance characteristic of light incident to a first area of the exemplary light guide plate of FIG. 3A, and FIG. 3D is a view illustrating the luminance characteristic of light incident to a second area of the exemplary light guide plate of FIG. 3A.

The backlight assembly 10 included in the LCD 1 according to the present invention is an edge type backlight assembly 10, in which a light source assembly 80 is located on the side of the light guide plate 70. An upper surface of the light guide plate 70 faces the liquid crystal panel assembly 20, a lower surface of the light guide plate 70 faces the reflection plate 90, and a side of the light guide plate 70 connects the upper surface to the lower surface of the light guide plate 70. In this embodiment of the present invention, the backlight assembly includes the light source assembly 80 located on one side of the flat light guide plate 70. However, the light source assembly 80 may be located on two opposing sides of the flat light guide plate 70. Alternatively, a wedge type light guide plate may be included in the backlight assembly 10 instead of the flat light guide plate 70.

In the light guide plate 70 according to an exemplary embodiment of the present invention, the side surface part on which the light source 85 is located is called the light input part 71, and an upper surface, from which the light incident to the light input part 71 and reflected from an inside of the light guide plate 70 is outputted, is called the light output part 72. Thus, the light input part 71 corresponds to a side surface of the light guide plate 70 and the light output part 72 corresponds to an upper surface of the light guide plate 70.

The light input part 71 forms one side surface of the light guide plate 70, and serves as a path through which the light emitted from the light source 85 is supplied. The light input part 71 is divided into a plurality of areas in which serration patterns for adjusting the path of the incident light are formed. The light output part 72 is the upper surface of the light guide plate 70 adjacent to the light input part 71, and serves as a path through which the light incident to the light input part 71 is outputted to the liquid crystal panel 30. That is, the light emitted from the light source 85 such as LEDs is incident to the inside of the light guide plate 70 through the light input part 71, and the light incident to the inside of the light guide plate 70 is totally reflected to the whole light guide plate 70. This light is reflected to the light output part 72 through various kinds of reflection patterns (not illustrated) printed on a lower surface of the light guide plate 70. The reflected light is outputted and supplied to the liquid crystal panel 30 through the light output part 72. The light outputted through the light output part 72 is substantially in the form of a surface light source.

Hereinafter, the light input part 71 will be described in detail. The light input part 71 is divided into a first area 170a and a second area 170b, and the light incident to the first area 170a and the light incident to the second area 170b are outputted in different directions. Specifically, the light incident to the first area 170a includes light substantially refracted to the left L of the light output part 72 based on the light output part 72, and the light incident to the second area 170b includes light substantially refracted to the right R of the light output part 72 based on the light output part 72. The light guide plate 70 includes the light input part 71 which corresponds to a first side surface of the light guide plate 70. A second side surface of the light guide plate 70 opposes the light input part 71. The light guide plate 70 further includes third and fourth opposing surfaces that connect the light input part 71 to the second side surface. The third and fourth opposing surfaces of the light guide plate 70 may be adjacent to the left L and right R, respectively, of the light output part 72.

Referring to FIGS. 3C and 3D, bright parts in FIGS. 3C and 3D indicate bright lines of the refracted light. The first area 170a and the second area 170b include first and second serration patterns 173a and 173b, respectively, as shown in FIGS. 3A and 3B. The first and second serration patterns 173a and 173b serve to adjust the whole paths of the light incident to the first area 170a and the second area 170b, so that the light is not concentrated on one part, but is diffused more widely over the whole light guide plate 70.

The first area 170a and the second area 170b may be formed in a body with the light input part 71 of the light guide plate 70, and the light incident to the first area 170a and the second area 170b travels to the inside of the light guide plate 70 formed in a body with the first and second areas 170a and 170b. That is, it is preferable that the first area 170a and the second area 170b are not formed separately from the light guide plate 70, but are formed in a body with the light guide plate 70, such as an integrally and unitarily formed body. The first area 170a may be formed in a first layer of the light guide plate 70 that is adjacent the light output part 72, and the second area 170b may be formed in a second layer of the light guide plate 70 that is overlapped by the first layer, and the first layer and the second layer may be integrally formed in a unitary body. If needed, in an alternative exemplary embodiment, the first area 170a and the second area 170b may extend to form a light guide plate having two separate layers that are subsequently formed together. In the case of forming the light guide plate having a plurality of layers, the light paths in the light guide plate can be changed and light reflecting surfaces are affected by the layers to provide various characteristics.

Referring to FIGS. 2 and 3A, the first area 170a includes the first serration pattern 173a for adjusting the light paths. Serrated threads of the first serration pattern 173a are inclined in a specified direction, and thus the whole light paths can be changed and the light can be diffused at larger angles. Specifically, the first serration pattern 173a includes a first oblique side 175a and a first vertical side 174a, and enlarges the refraction angle of the light, so that the light can travel more widely.

The serrated thread of the first serration pattern 173a forms a virtual right-angled triangle of which the base side B corresponds to a cross section that is parallel to the light output part 72. The virtual right-angled triangle is composed of the first oblique side 175a, the first vertical side 174a, and the base side B that is parallel to the light input part 71. The first vertical side 174a is perpendicular to the virtual base side B that is parallel to the light input part 71, and the first vertical side 174a, the base side B, and the first oblique side 175a form the right-angled triangle. The first vertical side 174a is shorter than the first oblique side 175a. The first serration pattern 173a includes a plurality of the above-described serrated threads and thus the first oblique sides 175a alternate with the first vertical sides 174a.

With reference to FIG. 3A, light paths will be described. The light being supplied from a point light source, such as light source 85, is incident to the first oblique side 175a and the first vertical side 174a. The light being supplied to the first oblique side 175a is refracted to the right R at a specified angle as it passes through the first oblique side 175a. In other words, the light being supplied to the first oblique side 175a is refracted in a direction at an angle towards the fourth side of the light guide plate 70. The reason why the light is refracted to the right R is that the refractive index of the light guide plate 70 is relatively larger than that of air. The light incident to the first oblique side 175a is refracted in a direction of a normal line of the first oblique side 175a.

On the other hand, the light incident in a direction of the first vertical side 174a is refracted on the first vertical side 174a. At this time, the light is refracted in the direction of the normal line of the first vertical side 174a as described above. Since the normal line of the first vertical side 174a is parallel to the light input part 71, the light incident to the first vertical side 174a is substantially refracted to the left L, which corresponds to the third side of the light guide plate 70. Accordingly, the light incident in the direction of the first vertical side 174a is radiated in much wider range than the light incident to the first oblique side 175a.

Hereinafter, with reference to FIGS. 2A, 2B, and 3B, the second area 170b will be described. The second area 170b includes the second serration pattern 173b for adjusting the light paths. The second serration pattern 173b includes a second oblique side 175b and a second vertical side 174b, and is symmetrical to the first serration pattern 173a included in the first area 170a on the basis of the normal line of the light input part 71. Also, the second oblique side 175b is longer than the second vertical side 174b, and the first and second vertical sides 174a and 174b may be substantially coplanar although facing in opposite directions. That is, through the symmetrical transposition based on the first vertical side 174a or the second vertical side 174b, the two patterns coincide with each other. The second serration pattern 173b includes a plurality of the above-described serrated threads and thus the second oblique sides 175b alternate with the second vertical sides 174b.

As described above, the light having passed through the first serration pattern 173a is substantially refracted to the left L, and the light quantity distribution is generally biased to the left L. By contrast, the light having passed through the second serration pattern 173b is substantially refracted to the right R, towards the fourth side of the light guide plate 70, and the light quantity distribution is generally biased to the right R. That is, the light incident to the second oblique side 175b is generally refracted to the left L, towards the third side of the light guide plate 70, while the light incident to the second vertical side 174b is generally refracted to the right R. However, as described above, although the normal line of the second oblique side 175b is moved to the right at a specified angle on the basis of the second vertical side 174b, the normal line of the second vertical side 174b is parallel to the light input part 71, and thus the refraction angle of the light incident through the second vertical side 174b is substantially enlarged. Accordingly, it can be seen that the bright lines of the light having passed through the second area 170b is generally biased to the right R of the light guide plate 70.

The light having passed through the first area 170a is symmetrical to the light having passed through the second area 170b, and by making the first area 170a and the second area 170b overlap each other, the lights substantially refracted right and left and the lights having small refraction angles and existing therebetween appear in a successive manner. Accordingly, the radiation area of bright lines of the light guide plate 70 widens right and left, and thus the whole light uniformity and the used area of the light guide plate 70 are increased.

That is, as both bright spots and dark spots disappear, the whole light uniformity and the used area of the light guide plate 70 are increased.

Hereinafter, the luminance characteristic of the light guide plate according to the exemplary embodiment of the present invention will be described.

First, referring to FIG. 3C, the light incident to the first area 170a is refracted on the first serration pattern 173a, and the light quantity distribution is generally biased to the left L. As described above, the light having passed through the first serration pattern 173a includes the light substantially refracted to the left L and a portion of the light somewhat biased to the right R and radiated to the front side, such as towards the second side of the light guide plate 70 which opposes the light input part 71. The light refraction angle or the light density can be adjusted through the shape of the first serration pattern 173a.

Referring to FIG. 3D, the light incident to the second area 170b is refracted on the second serration pattern 173b, and the light quantity distribution is generally biased to the right R. The light having passed through the second serration pattern 173b includes the light substantially refracted to the right R and a portion of the light somewhat biased to the left L and radiated to the front side, such as towards the second side of the light guide plate 70 which opposes the light input part 71. As shown in FIGS. 3C and 3D, the first and second serration patterns 173a and 173b are symmetrical to each other, and thus paths of the lights having passed through the first and second serration patterns 173a, 173b are also symmetrical to each other.

The light paths as illustrated in FIGS. 3C and 3D are merely exemplary results obtained through the light guide plate according to an exemplary embodiment of the present invention, and it is possible to adjust the light refraction angle or the light density through the adjustment of the first and second serration patterns 173a and 173b. For example, the angle between the first and second vertical sides 174a, 174b and the first and second oblique sides 175a, 175b may be adjusted to adjust the light refraction angle or light density.

Referring again to FIG. 1, the light source 85 serves to supply the light to the liquid crystal panel 30, and in the backlight assembly 10, at least one light source 85 is installed. Here, a point light source such as light emitting diodes ("LEDs") may be used as the light source 85.

The reflection plate 90 is installed on the lower surface of the light guide plate 70, and reflects the light emitted to the lower part of the light guide plate 70 to the upper part of the light guide plate 70. The reflection plate 90 is located on the lower surface of the light guide plate 70, and reflects the light, which has not reflected by a recessed part or a flat part formed on the bottom surface of the light guide plate 70, but has passed through a surface of the light guide plate 70, to the inside of the light guide plate 70 again or to the liquid crystal panel 30 through the light guide plate 70, so that a loss of light emitted from the light source 85 is minimized and the uniformity of light being supplied to the liquid crystal panel 30 through the light guide plate 70 is improved.

The optical sheet 60 is installed on the upper surface of the light guide plate 70, and serves to diffuse and condense the light transferred from the light guide plate 70. As needed, the optical sheet 60 may include at least one of a diffusion sheet, a prism sheet, and a protection sheet. The diffusion sheet prevents the light from being partly crowded by dispersing the incident light from the light guide plate 70. The prism sheet has triangular prisms arranged on the upper surface thereof, and serves to condense the light diffused from the diffusion sheet in a direction vertical to the liquid crystal panel 30. Accordingly, most light passing through the prism sheet travels vertically, and thus the luminance distribution on the protection sheet becomes uniform. The protection sheet serves to protect the surface of the prism sheet and to diffuse the light in order to make the light distribution uniform.

The LCD 1 according to an exemplary embodiment of the present invention may include a prism pattern on the upper surface of the light guide plate 70, and use one prism sheet or both a prism sheet and a protection sheet as the separate optical sheet 60. Also, in the case where a sufficient condensing effect can be obtained through such a prism pattern, only a protection sheet may be provided without adding a separate prism sheet in the optical sheet 60.

As described above, when a prism pattern is formed on the upper surface of the light guide plate 70, the use of a separate prism sheet or diffusion sheet can be minimized.

Referring to FIGS. 1 to 3, in the lower receptacle 95, the reflection plate 90, the light source 85, the light guide plate 70, and the optical sheet 60 are received in order. The lower receptacle 95 may be formed with a metallic material such as a chassis in order to secure the strength against an external impact and grounding capability.

The intermediate frame 50 is composed of four side walls to form a rectangular frame. The intermediate frame 50 is arranged on an outer side of the side walls of the lower receptacle 95.

The liquid crystal panel 30 is arranged on the protection sheet, and is placed in the intermediate frame 50. In order to prevent the damage of components fixed by the intermediate frame 50, a plastic mold frame may be provided as the intermediate frame 50.

In order to cover the upper surface of the liquid crystal panel 30 received in the intermediate frame 50, the upper receptacle 40 is engaged with the lower receptacle 95. On the upper surface of the upper receptacle 40, a window for exposing the liquid crystal panel 30 to an outside is formed. The upper receptacle 40, in the same manner as the lower receptacle 95, may be formed with a metallic material such as a chassis in order to secure the strength against an external impact and grounding capability. The upper receptacle 40 may be hook-engaged with the lower receptacle 95.

In addition, the PCB 23 of the liquid crystal panel assembly 20 is bent along an outer surface of the intermediate frame 50, and is placed on a side surface or rear surface of the lower receptacle 95.

Figure 4:
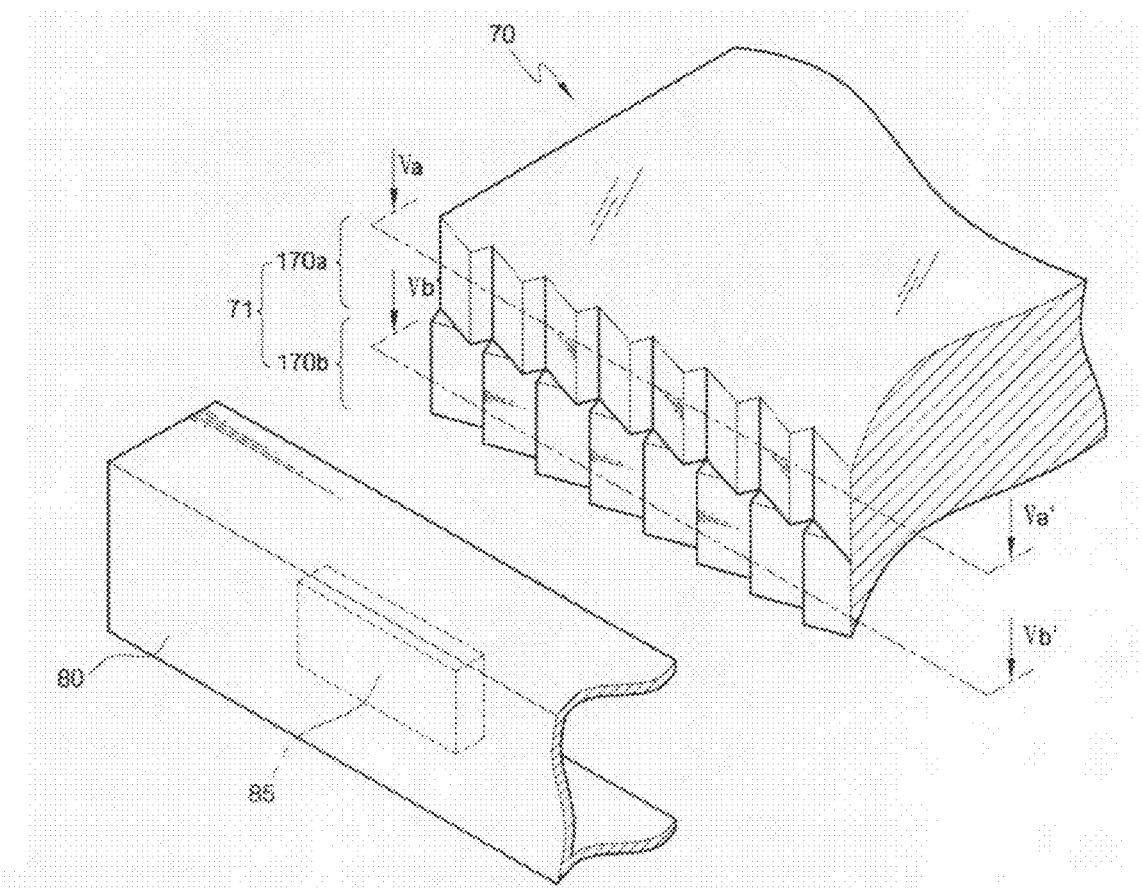
FIG. 4 is a perspective view illustrating a part of an exemplary light guide plate according to a second exemplary embodiment of the present invention.
Figure 5A:
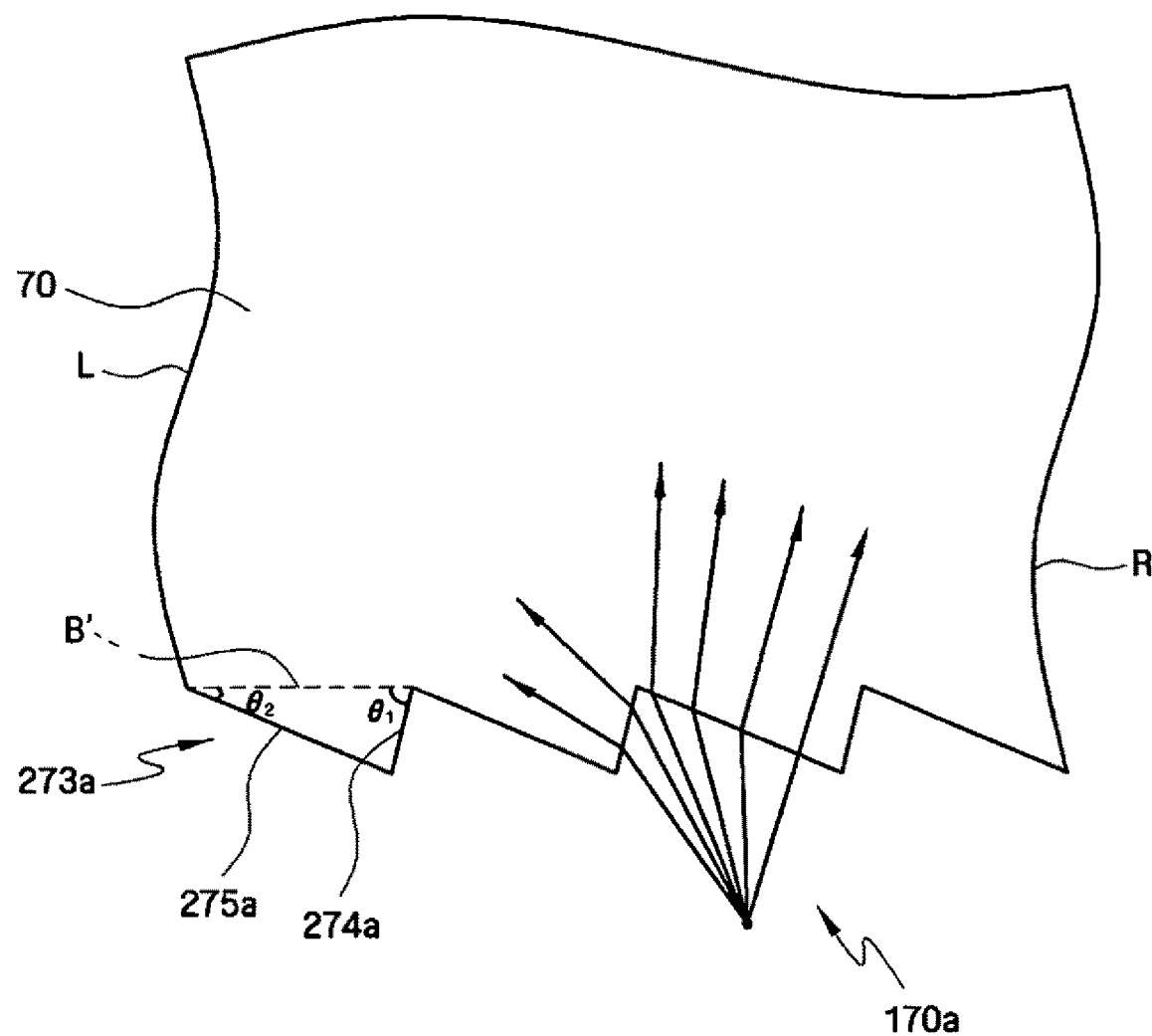
FIG. 5A is a sectional view of the exemplary light guide plate, taken along line Va-Va' of FIG. 4.
Figure 5B:
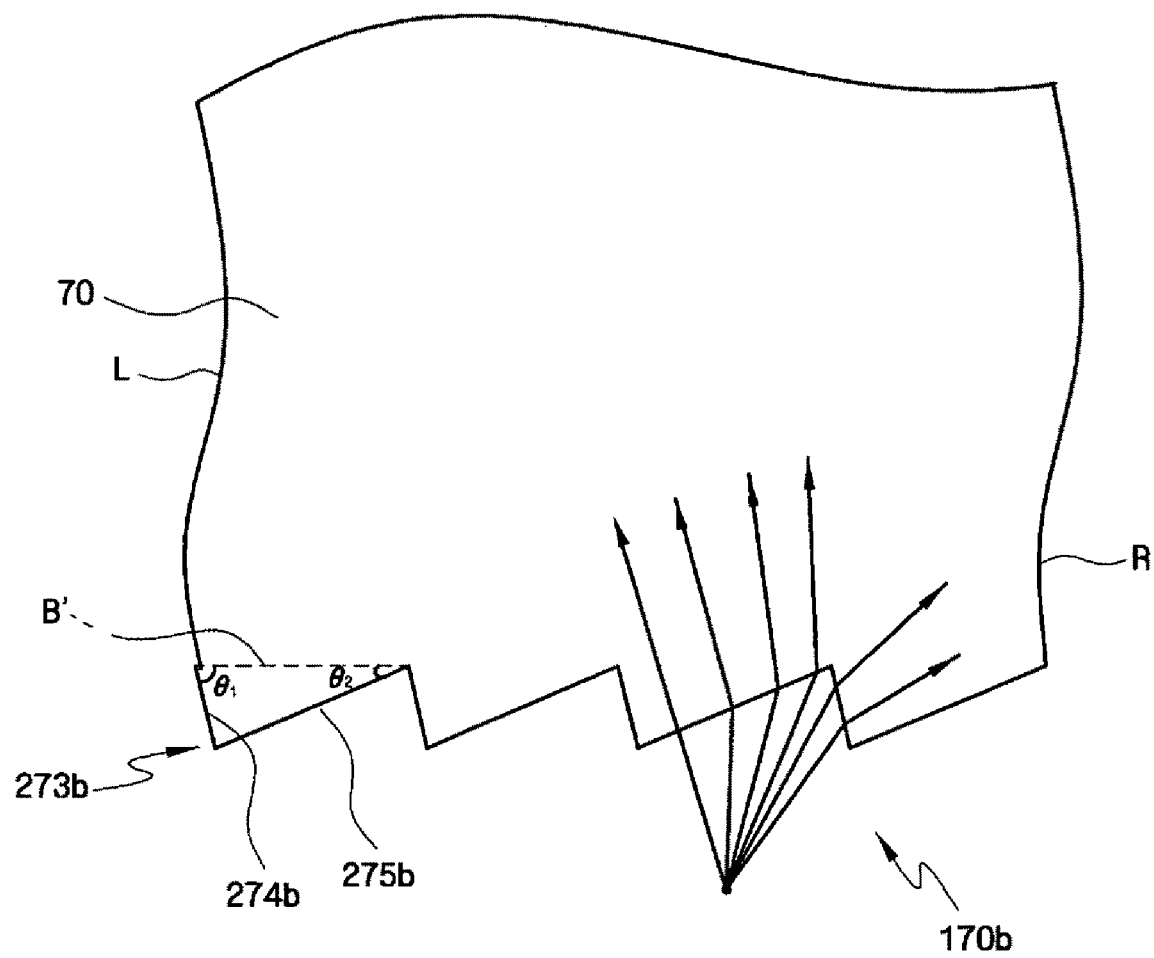
FIG. 5B is a sectional view of the exemplary light guide plate, taken along line Vb-Vb' of FIG. 4.

Hereinafter, with reference to FIGS. 4, 5A, and 5B, an exemplary light guide plate according to a second exemplary embodiment of the present invention will be described in detail. Here, FIG. 4 is a perspective view illustrating a part of the exemplary light guide plate according to a second exemplary embodiment of the present invention. FIG. 5A is a sectional view of the exemplary light guide plate, taken along line Va-Va' of FIG. 4, and FIG. 5B is a sectional view of the exemplary light guide plate, taken along line Vb-Vb' of FIG. 4.

In the light guide plate according to the second exemplary embodiment of the present invention, a cross section of the serrated thread of the first serration pattern 273a forms a virtual acute-angled triangle composed of a first side 274a, a second side 275a and a virtual base side B' that is parallel to the light input part 71. If it is assumed that the angle between the first side 274a and the base side B' is $\theta_1$ and the angle between the second side 275a and the base side B' is $\theta_2$, the first serration pattern 273a can be formed to satisfy $\theta_1 > \theta_2$. In this embodiment, both $\theta_1$ and $\theta_2$ form acute angles such that neither side is formed perpendicular to the base side B' as in the prior embodiment. Similar to the prior embodiment, however, the second side 275a is longer than the first side 274a, just as the oblique sides 175a and 175b were longer than the vertical sides 174a and 174b. At this time, if the light from the light source 85 is incident to the inside of the light guide plate 70 through the first side 274a and the second side 275a, the light paths are refracted.

Referring to FIG. 5A, the light incident through the first side 274a is substantially refracted in a direction of the normal line of the first side 274a, and the light incident through the second side 275a is refracted along the second side 275a. At this time, the refraction angle of the light incident through the first side 274a is substantially enlarged, and thus the light quantity distribution of the light having passed through the first serration pattern 273a is generally biased to the left L, such as towards the third side of the light guide plate 70.

The second serration pattern 273b of the second area 170b is symmetrical to the first serration pattern 273a, and thus the light paths thereof are also symmetrical to each other. That is, as illustrated in FIG. 5B, although the light incident to the third side 274b is substantially refracted to the right R and the light incident to the fourth side 275b is refracted to the left L, the light incident to the second serration pattern 273b is generally biased to the right R, such as towards the fourth side of the light guide plate 70.

By making the light paths of the first area 170a and the second area 170b overlap each other, the refraction angle of the light from the light source 85 becomes substantially widened. On the other hand, either of the first area 170a and the second area 170b may be formed to be protruded to form a stepped portion.

Figure 6:
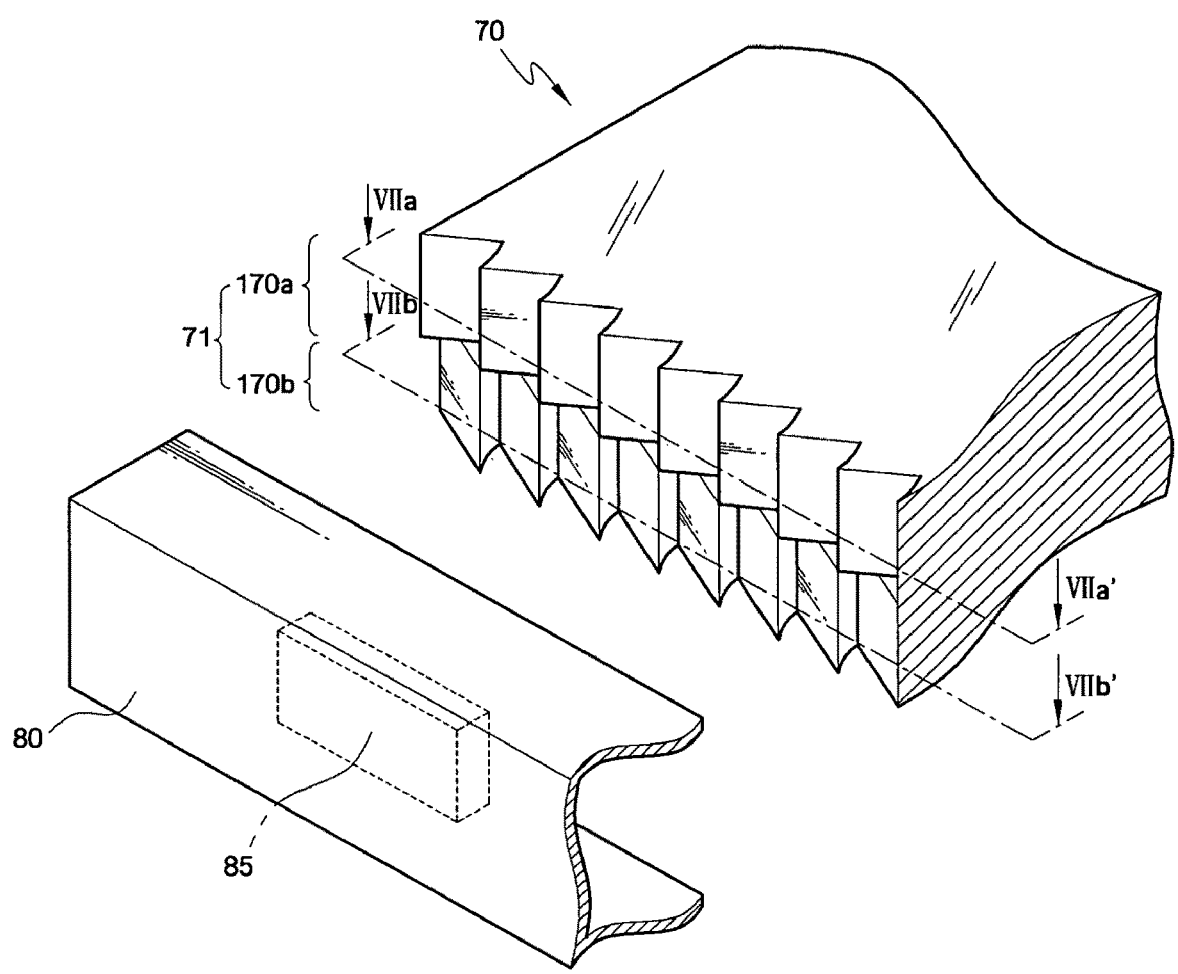
FIG. 6 is a perspective view illustrating a part of an exemplary light guide plate according to a third exemplary embodiment of the present invention.
Figure 7A:
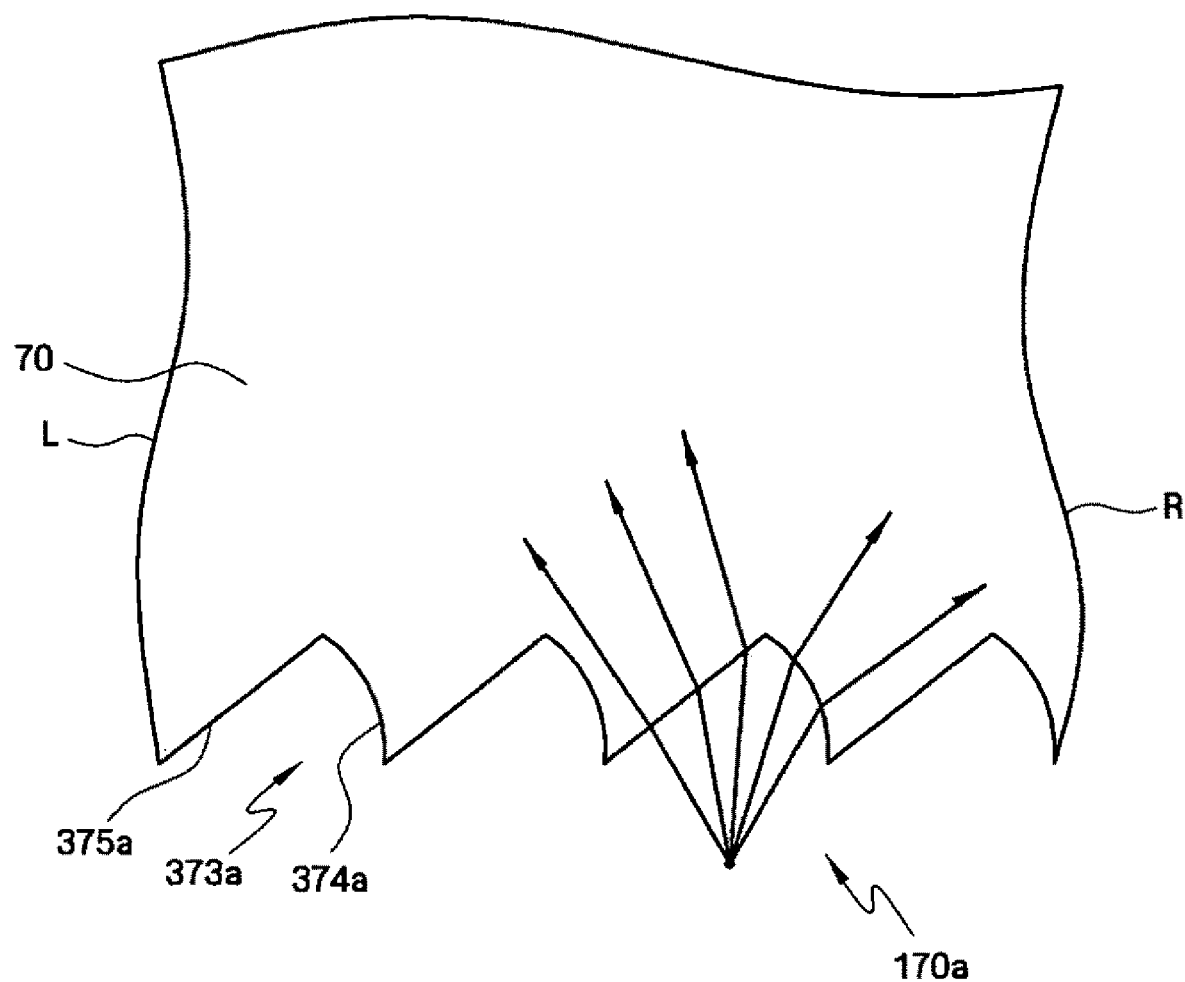
FIG. 7A is a sectional view of the exemplary light guide plate, taken along line VIIa-VIIa' of FIG. 6.
Figure 7B:
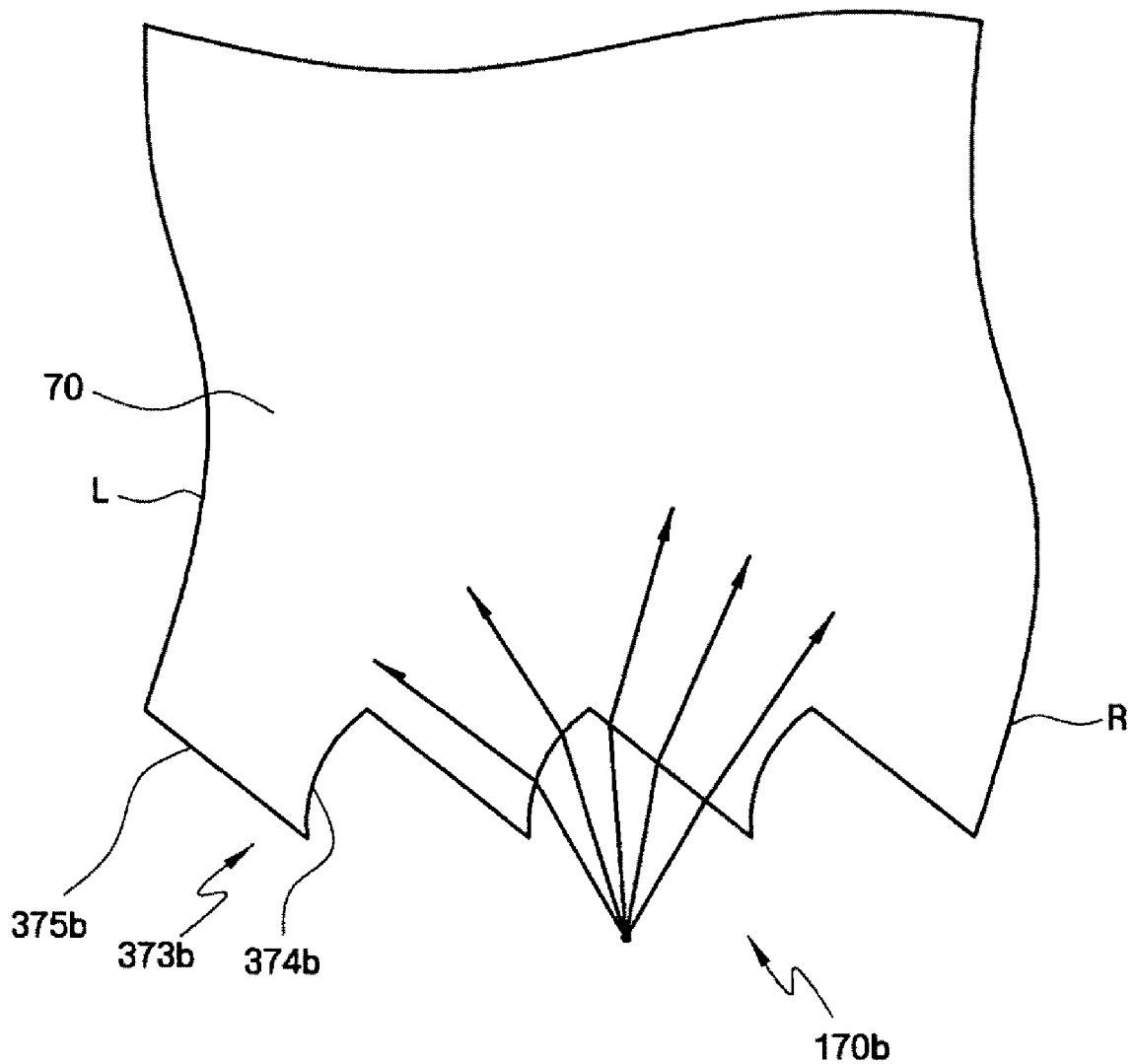
FIG. 7B is a sectional view of the exemplary light guide plate, taken along line VIIb-VIIb' of FIG. 6.

Hereinafter, with reference to FIGS. 6, 7A, and 7B, the light guide plate according to the third exemplary embodiment of the present invention will be described in detail. Here, FIG. 6 is a perspective view illustrating a part of an exemplary light guide plate according to a third exemplary embodiment of the present invention. FIG. 7A is a sectional view of the exemplary light guide plate, taken along line VIIa-VIIa' of FIG. 6, and FIG. 7B is a sectional view of the exemplary light guide plate, taken along line VIIb-VIIb' of FIG. 6.

In the light guide plate according to the third exemplary embodiment of the present invention, a cross section of the first and second serration patterns 373a and 373b included in the first area 170a and the second area 170b has an oblique side and a curved side.

With reference to FIGS. 6 and 7A, the cross section of the first serration pattern 373a includes a first oblique side 375a and a first curved side 374a. The oblique sides 375a alternate with the curved sides 374a. The first oblique side 375a and the first curved side 374a serve to refract the paths of the incident light as much as needed. As described above, the light incident to the first oblique side 375a is refracted in a direction of the normal line of the first oblique side 375a, and the light incident to the first curved side 374a is refracted in a direction of the normal line to the tangent line of the incident surface. That is, the refraction direction of the light incident to the first curved side 374a differs in accordance with the curvature of the first curved side 374a. The curvature of the first curved side 374a can be adjusted to match a desired light path. Once the curvature of the first curved side 374a is adjusted, the density of the refracted light can be properly adjusted.

The light incident to the first oblique side 375a is refracted to the left L that is the direction of the normal line of the first oblique side 375a, and the light incident to the first curved side 374a is refracted in the direction of the normal line of the incident surface, so that the radiation angle of the light is generally enlarged and the light is generally biased to the right R. Accordingly, the light having passed through the first serration pattern 373a is generally biased to the right R, such as towards the fourth side of the light guide plate 70.

The second serration pattern 373b formed in the second area 170b includes a second oblique side 375b and a second curved side 374b, where the second oblique sides 375b alternate with the second curved sides 374b. Referring to FIG. 7B, the second serration pattern 373b is symmetrical to the first serration pattern 373a. The light having passed through the second serration pattern 373b is substantially refracted in a direction of the second curved side 374b, and thus is generally biased to the left L, such as towards the third side of the light guide plate 70.

By making the light paths of the first area 170a and the second area 170b overlap each other, the refraction angle of the light from the light source 85 becomes substantially widened, and by properly adjusting the curvatures of the first and second curved sides 374a and 374b, the angle of the light can be easily adjusted.

Figure 8A:
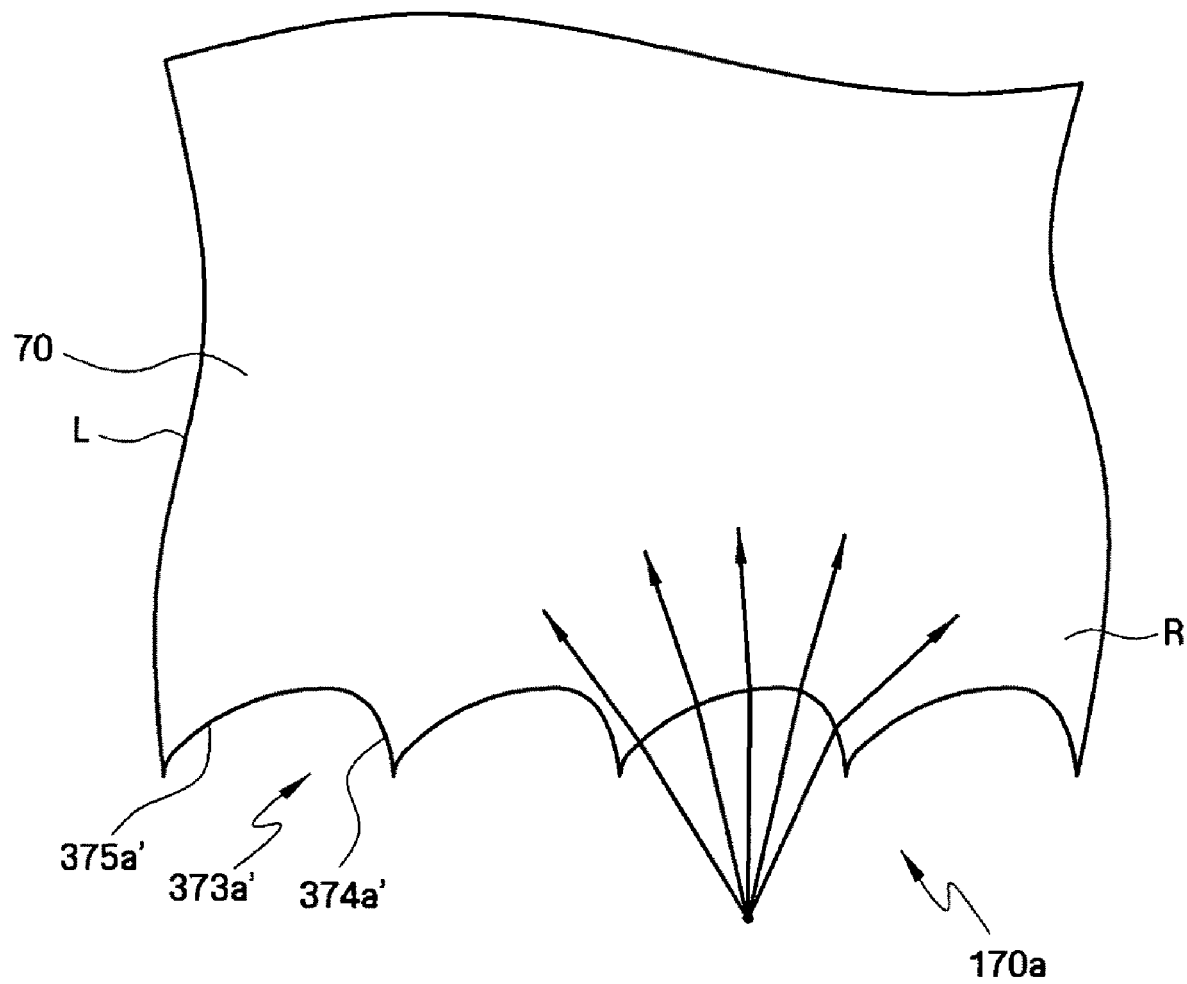
FIGS. 8A and 8B are views illustrating an exemplary modification of serration patterns of FIGS. 7A and 7B.
Figure 8B:
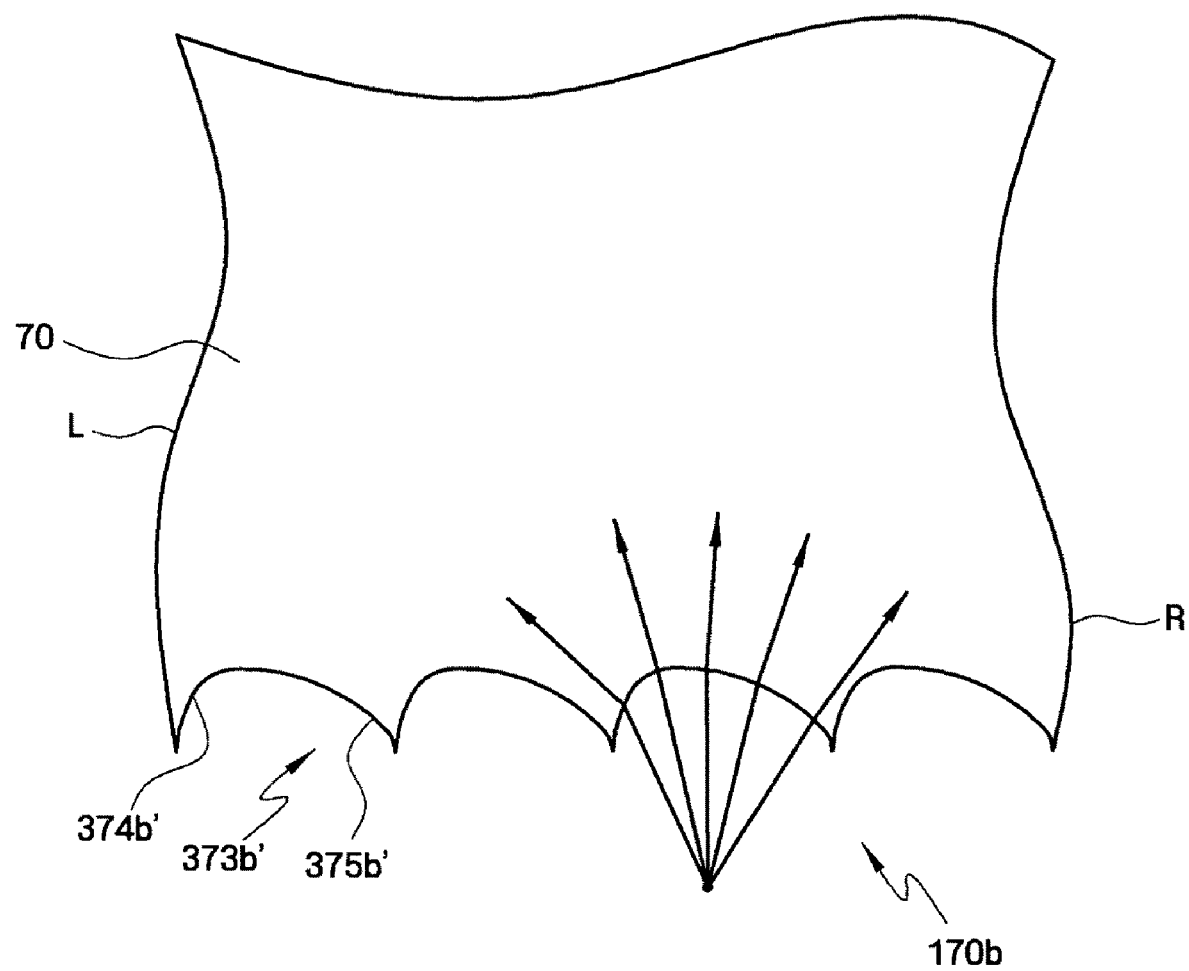

Hereinafter, with reference to FIGS. 8A and 8B, an exemplary modification of the first and second serration patterns 373a' and 373b' will be described. Here, FIGS. 8A and 8B are views illustrating an exemplary modification of exemplary serration patterns of FIGS. 7A and 7B.

The modification of the first and second serration patterns 373a' and 373b' includes curved sides having different curvatures. First, a cross section of the first serration pattern 373a' includes a first curved side 374a' and a second curved side 375a', and the first curved sides 374a' alternate with the second curved sides 375a'. The first curved side 374a' is shorter than the second curved side 375a', and has a small radius of curvature, while the second curved side 375a' is relatively long and has a large radius of curvature in comparison to the first curved side 374a'. If the first curved side 374a' and the second curved side 375a' are formed as described above, the light is biased in a direction of the first curved side 374a', i.e., to the right R, and generally in a direction towards the fourth side of the light guide plate 70. Here, the lengths and curvatures of the first curved side 374a' and the second curved side 375a' can be adjusted as needed.

The second serration pattern 373b' includes a third curved side 374b' and a fourth curved side 375b', and is formed to be symmetrical to the first serration pattern 373a'. The light incident to the second serration pattern 373b' is generally biased to the left L, and generally in a direction towards the third side of the light guide plate 70, and is symmetrical to the light having passed through the first serration pattern 373a'.

By making the light paths of the first area 170a and the second area 170b overlap each other, the refraction angle of the light from the light source 85 becomes substantially widened, and by properly adjusting the curvatures of the first to fourth curved sides 374a', 375a', 374b', and 375b', the direction and density of the light can be properly adjusted.

Figure 9A:
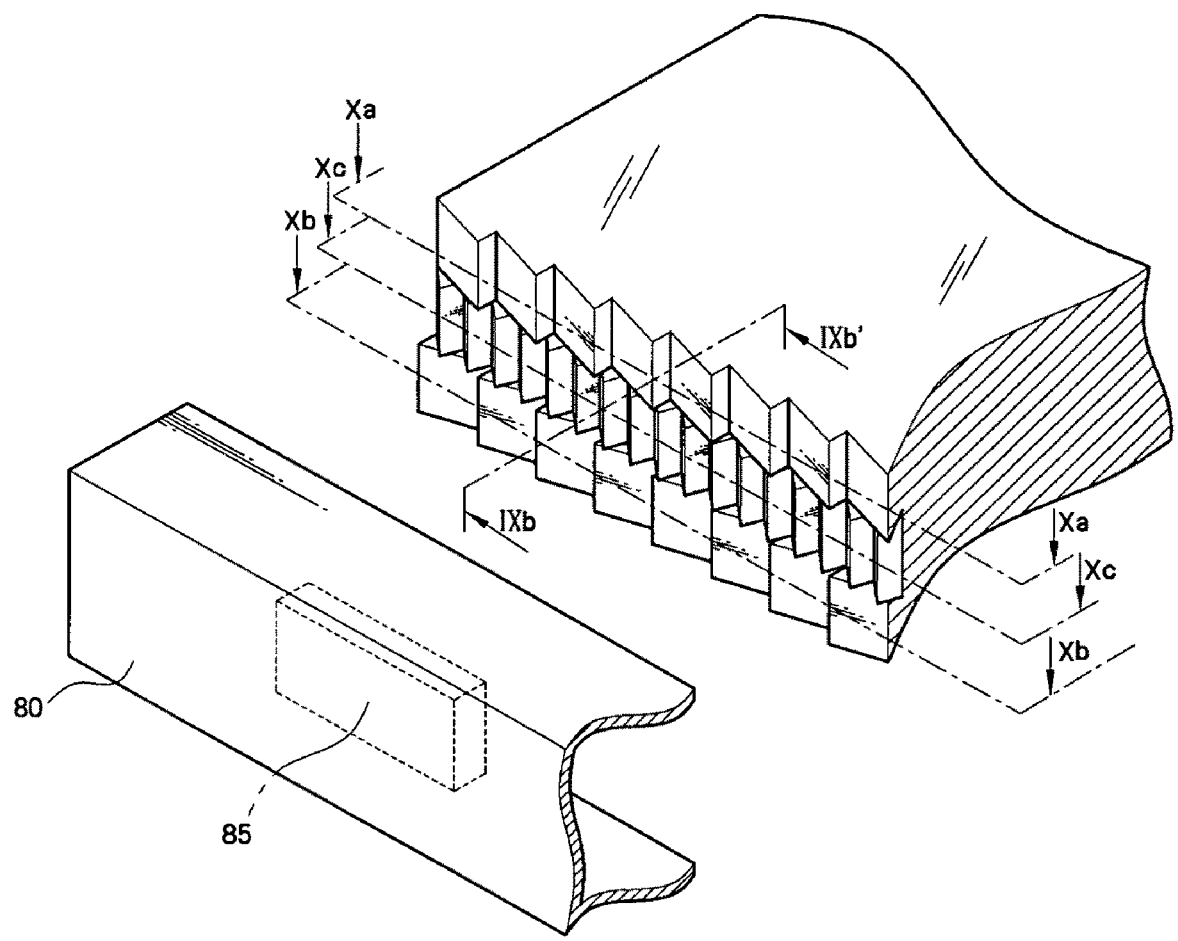
FIG. 9A is a perspective view illustrating a part of an exemplary light guide plate according to a fourth exemplary embodiment of the present invention.
Figure 9B:
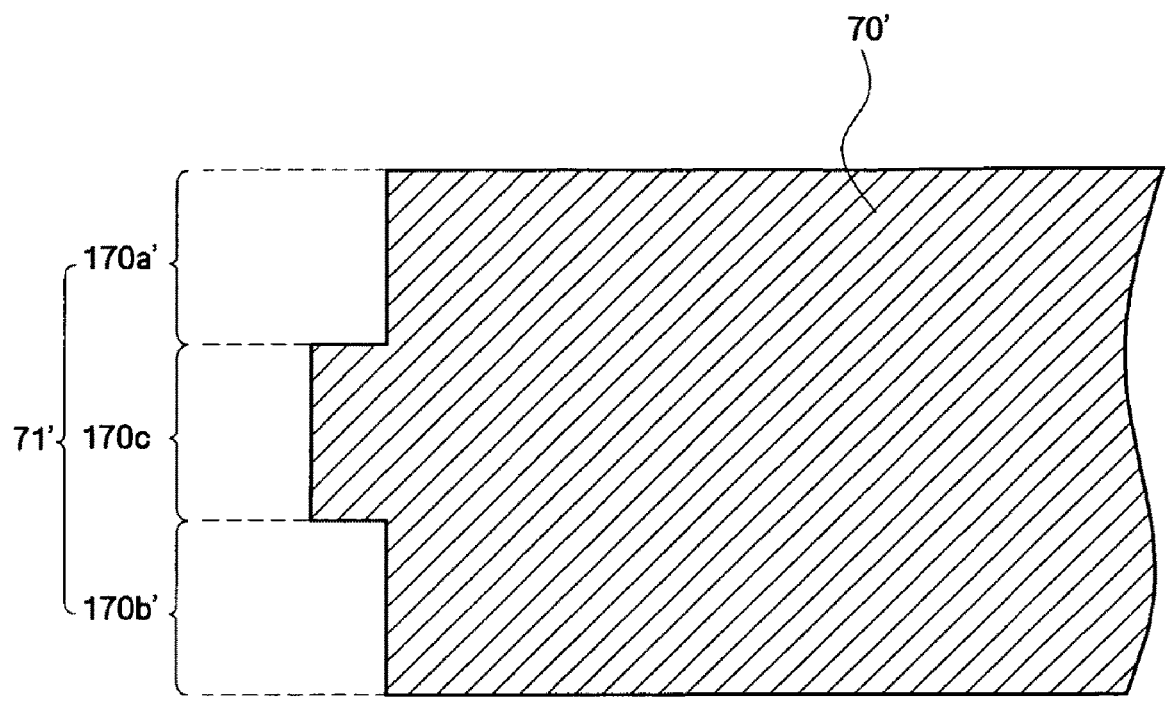
FIG. 9B is a sectional view of the exemplary light guide plate, taken along line IXb-IXb' of FIG. 9A.
Figure 10A:
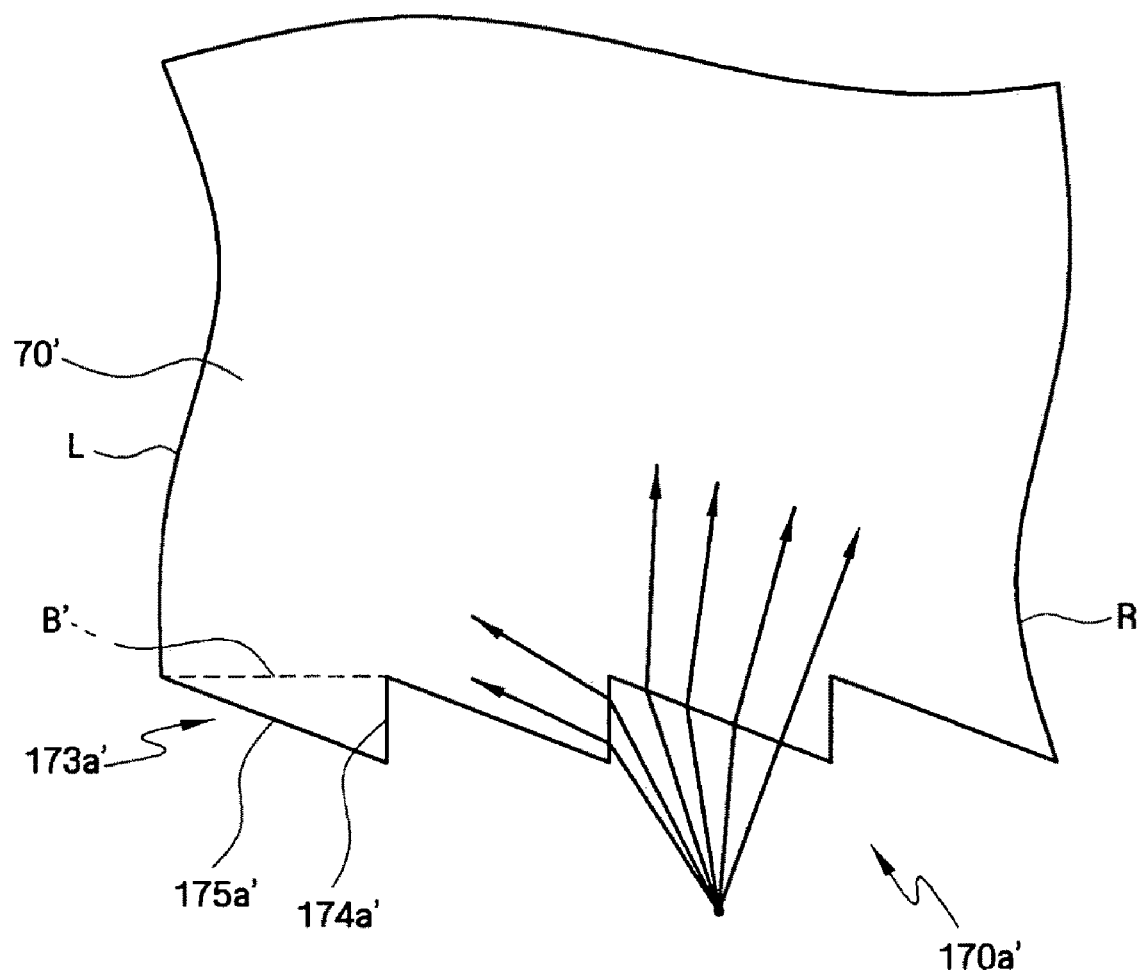
FIG. 10A is a sectional view of the exemplary light guide plate, taken along line Xa-Xa' of FIG. 9A.
Figure 10B:
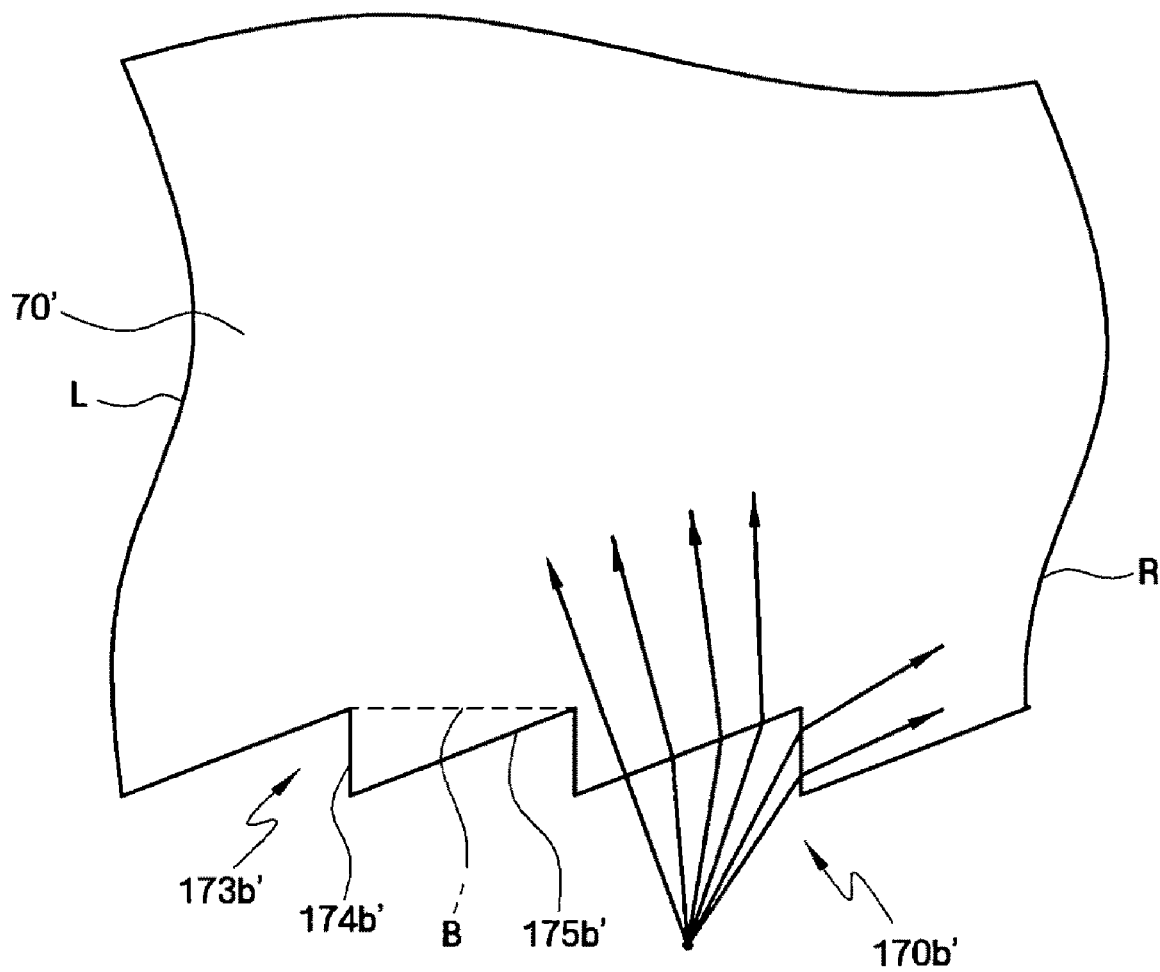
FIG. 10B is a sectional view of the exemplary light guide plate, taken along line Xb-Xb' of FIG. 9A.
Figure 10C:
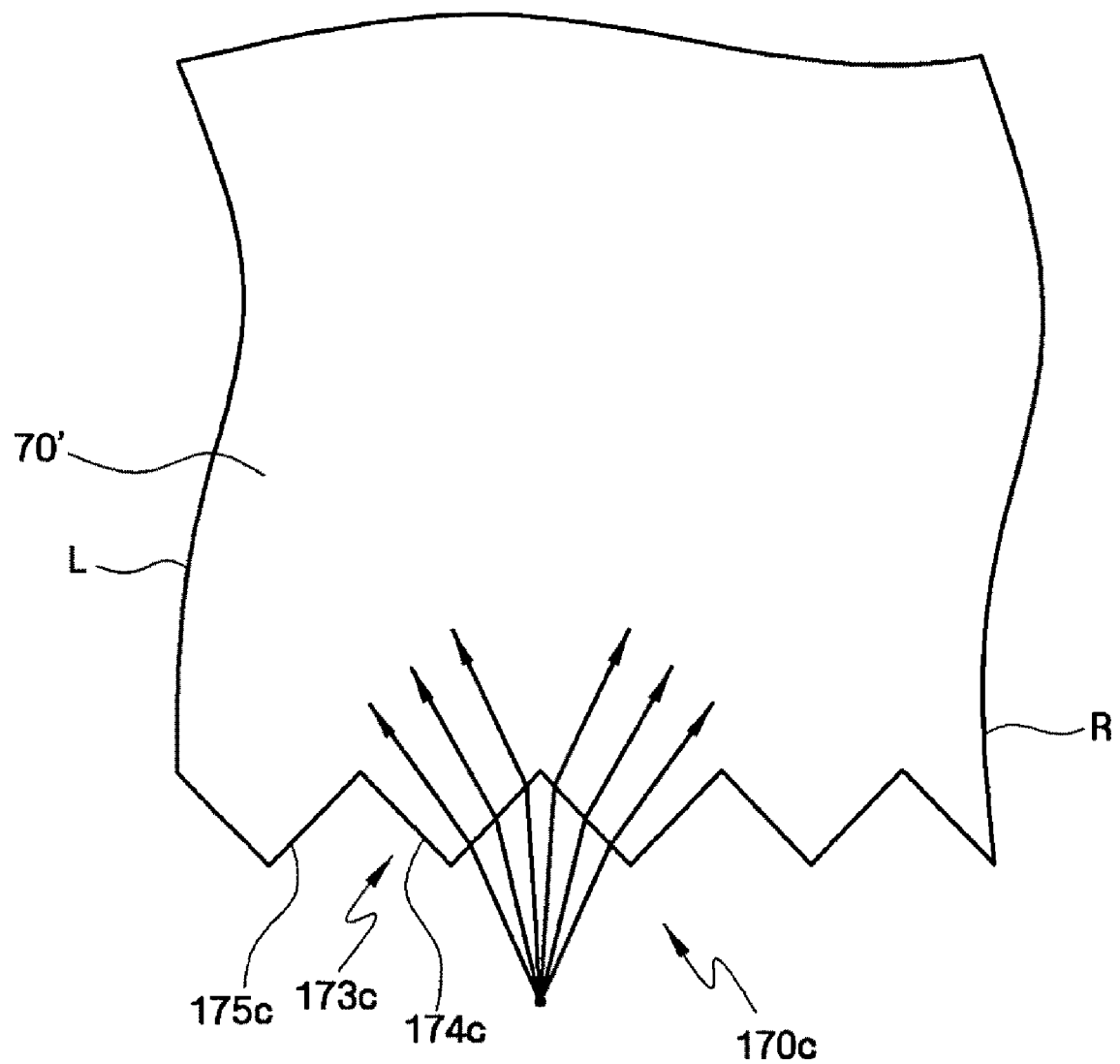
FIG. 10C is a sectional view of the exemplary light guide plate, taken along line Xc-Xc' of FIG. 9A.

Hereinafter, with reference to FIGS. 9A to 10C, an exemplary light guide plate according to a fourth exemplary embodiment of the present invention will be described in detail. Here, FIG. 9A is a perspective view illustrating a part of an exemplary light guide plate according to a fourth exemplary embodiment of the present invention, and FIG. 9B is a sectional view of the exemplary light guide plate, taken along line IXb-IXb' of FIG. 9A. FIG. 10A is a sectional view of the exemplary light guide plate, taken along line Xa-Xa' of FIG. 9A, FIG. 10B is a sectional view of the exemplary light guide plate, taken along line Xb-Xb' of FIG. 9A, and FIG. 10C is a sectional view of the exemplary light guide plate, taken along line Xc-Xc' of FIG. 9A.

The light guide plate according to the fourth exemplary embodiment of the present invention includes a first area 170a' and a second area 170b' for refracting the light mainly right R and left L, respectively, and a third area 170c' for symmetrically diffusing the light right R and left L.

The first and second serration patterns 173a' and 173b' included in the first area 170a and the second area 170b, respectively, refract the incident light mainly right and left, and widen the refraction angle mainly right and left, respectively. While first and second serration patterns 173a' and 173b', similar to the first and second serration patterns 173a and 173b of FIGS. 3A and 3B, are shown in this embodiment, the other exemplary embodiments of first and second serration patterns for refracting the incident light mainly right and left, and widening the refraction angle mainly right and left, respectively, may also be used in this embodiment. Here, the third area 170c for bisymmetrically diffusing the light is added.

The light input part 71' includes the third area 170c in addition to the first area 170a' and the second area 170b', and the third area 170c includes a third serration pattern 173c. The third serration pattern 173c is bisymmetrically formed to uniformly diffuse the light right and left. For example, a cross-section of the third serration pattern 173c reveals a symmetrical shape. The third serration pattern 173c may be formed as an isosceles triangle. The pitch of the third serration pattern 173c may be formed to be smaller than the pitch of the first serration pattern 173a' or the second serration pattern 173b'. By adjusting the pitch of the third serration pattern 173c as described above, the light passing through the first serration pattern 173a' or the second serration pattern 173b' is complemented to improve the uniformity of the light.

The third serration pattern 173c includes a first side 174c and a second side 175c, which have the same length, and an isosceles triangle is formed by the first side 174c, the second side 175c, and a virtual base side parallel to the light input part 71. The light incident to the first side 174c and the light incident to the second side 175c are refracted in directions of normal lines of the first side 174c and the second side 175c, respectively, and thus the light can be bisymmetrically supplied.

The first to third areas 170a', 170b', and 170c diffuse the lights by refracting the lights incident to the respective areas, respectively, and the light can be uniformly supplied over the whole surface, or at least substantially the whole surface, of the light guide plate 70 by making the respective areas overlap one another. That is, since the light incident to the light input part 71 is divided into three areas and the light paths are adjusted as needed, the light path adjustment or the hot spot control can be easily performed.

In the fourth exemplary embodiment of the present invention, the light input part 71 is divided into three areas and different serration patterns are formed by areas. However, the present invention is not limited thereto. That is, since the width and the thickness of the light guide plate become different in accordance with the size and the use of the liquid crystal panel, it is possible to divide the light input part 71 into more than three areas as needed.

Hereinafter, with reference to FIG. 11, a modification of the third serration pattern 173c will be described. Here, FIG. 11 is a view illustrating the modification of the exemplary serration pattern of FIG. 10C.

Figure 11:
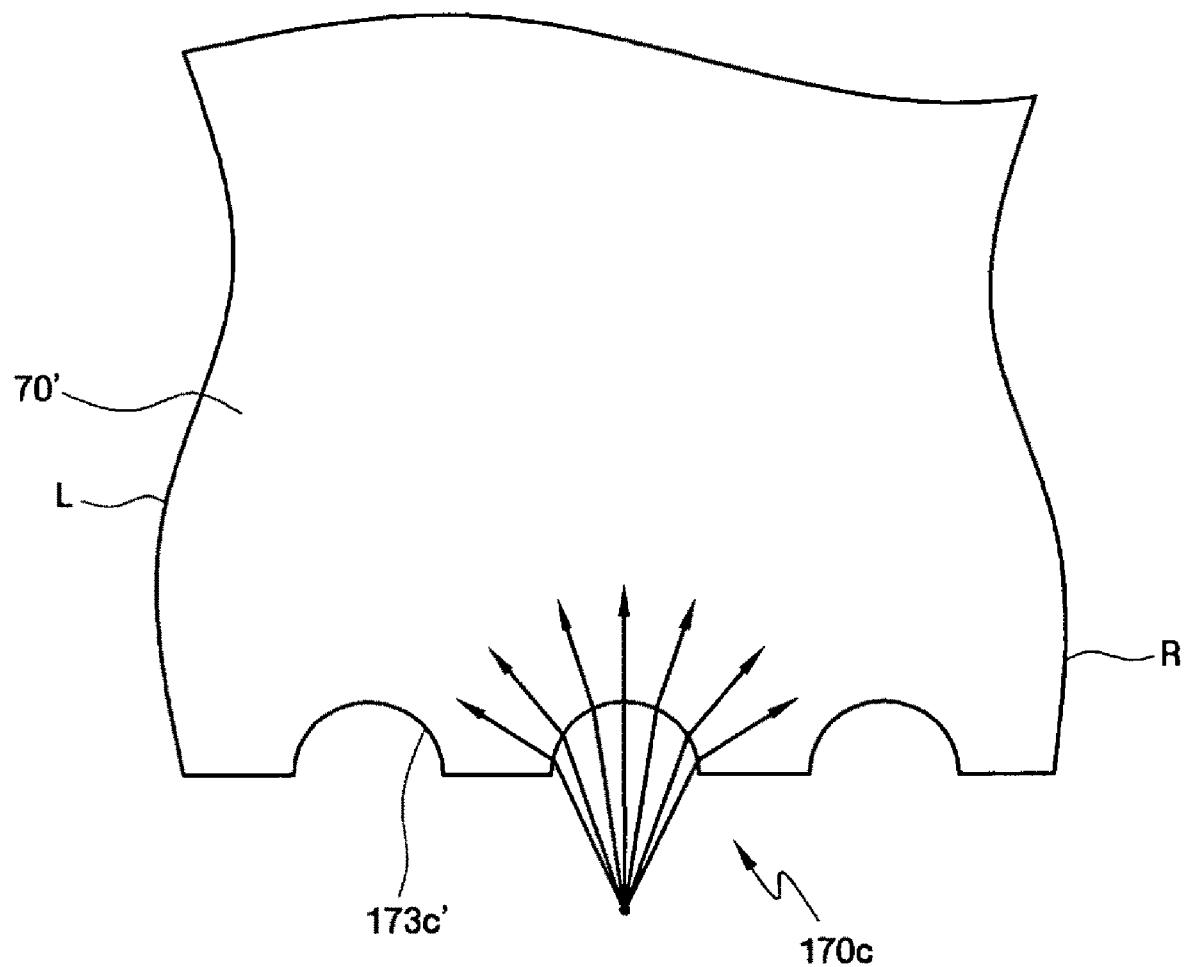
FIG. 11 is a view illustrating a modification of a serration pattern of FIG. 10B.

As shown in FIG. 11, the third serration pattern 173c' includes a cross section which may include curved sides bisymmetrically formed. Such a curve may be a part of a circle or an ellipse. In addition, various curved sides may be provided, considering the shapes of the first and second serration patterns.

While the present invention has been particularly shown and described with reference to exemplary embodiments thereof, it will be understood by those of ordinary skill in the art that various changes in form and details may be made therein without departing from the spirit and scope of the present invention as defined by the following claims. It is therefore desired that the present embodiments be considered in all respects as illustrative and not restrictive, reference being made to the appended claims rather than the foregoing description to indicate the scope of the invention.

As described above, according to the light guide plate and the LCD having the same, bright spots are not generated in the light input part.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A light guide plate comprising:
   a light input part including first and second areas to which light is incident; and
   a light output part neighboring the light input part and outputting light;
   wherein the light having passed through the first area is emitted with its light quantity distribution biased in a first direction, and the light having passed through the second area is emitted with its light quantity distribution biased in a second direction different from the first direction, and
   wherein
      the first area includes a row of a first serration pattern each including a first serrated thread adjacent to a normal line of the light output part,
      the second area includes a row of a second serration pattern each including a second serrated thread adjacent to the normal line,
      the first serrated thread overlaps the second serrated thread, and
      the second serrated thread is inclined from the normal line in a different direction than the first serrated thread.

2. The light guide plate of claim 1, wherein the first and the second serration patterns are symmetrical to each other around the normal line of the light input part.

3. The light guide plate of claim 2, wherein the first and the second serrated threads of the first and the second serration patterns form a part of a right-angled triangle.

4. The light guide plate of claim 2, wherein the first and the second serrated threads of the first and the second serration patterns form a part of an acute-angled triangle.

5. The light guide plate of claim 2, wherein each of the first and the second serrated threads of the first and the second serration patterns is composed of an oblique side and a curved side.

6. The light guide plate of claim 2, wherein each of the first and the second serrated threads of the first and the second serration patterns is composed of a first curved side and a second curved side having a radius of curvature smaller than that of the first curved side.

7. The light guide plate of claim 1, wherein the light input part further includes a third area, and the third area symmetrically emits the light around the normal line of the light input part.

8. The light guide plate of claim 7, wherein the third area includes a third serration pattern having a symmetrical cross section around the normal line of the light input part.

9. The light guide plate of claim 8, wherein a third serrated thread of the third serration pattern forms a part of an isosceles triangle.

10. The light guide plate of claim 8, wherein a pitch of the third serration pattern is formed to be smaller than a pitch of the first serration pattern or the second serration pattern.

11. The light guide plate of claim 8, wherein the third serration pattern includes curved sides symmetrically formed.

12. The light guide plate of claim 1, wherein the first area and the second area are arranged in parallel to a boundary part between the light input part and the light output part.

13. The light guide plate of claim 1, wherein either of the first area and the second area is protruded to form a stepped portion.

14. A display device comprising:
   a display panel on which an image is displayed;
   a light source supplying light to the display panel;
   a light input part including first and second areas to which light is incident; and
   a light output part neighboring the light input part and outputting light;
   wherein the light having passed through the first area is emitted with its light quantity distribution biased in a first direction, and the light having passed through the second area is emitted with its light quantity distribution biased in a second direction different from the first direction, and
   wherein
      the first area includes a row of a first serration pattern each including a first serrated thread adjacent to a normal line of the light output part,
      the second area includes a row of a second serration pattern each including a second serrated thread adjacent to the normal line,
      the first serrated thread overlaps the second serrated thread, and
      the second serrated thread is inclined from the normal line in a different direction than the first serrated thread.

15. The display device of claim 14, wherein the first and the second serration patterns are symmetrical to each other around the normal line of the light input part.

16. The display device of claim 15, wherein the first and the second serrated threads of the first and the second serration patterns form a part of a right-angled triangle.

17. The display device of claim 15, wherein the first and the second serrated threads of the first and the second serration patterns form a part of an acute-angled triangle.

18. The display device of claim 14, wherein the light input part further includes a third area, and the third area symmetrically emits the light around the normal line of the light input part.

19. The display device of claim 18, wherein the third area includes a third serration pattern having a symmetrical cross section around the normal line of the light input part.

20. The display device of claim 14, wherein the light source comprises a plurality of point light sources.

21. A method of improving uniformity of light emission from a light guide plate, the light guide plate including a light input part to which light is incident and a light output part neighboring the light input part and outputting light, the method comprising:

forming a first area in the light input part to pass light therethrough with a light quantity distribution biased in a first direction, the first area including a row of a first serration pattern each including a first serrated thread adjacent to a normal line of the light output part; and, forming a second area in the light input part to pass light therethrough with a light quantity distribution biased in a second direction, different than the first direction, the second area including a row of a second serration pattern each including a second serrated thread adjacent to the normal line, wherein the first serrated thread overlaps the second serrated thread, and the second serrated thread is inclined from the normal line in a different direction than the first serrated thread.

* * * * *